Aug. 17, 1926.
A. B. HANNA
1,596,831
GLARESHIELD
Filed March 9, 1926
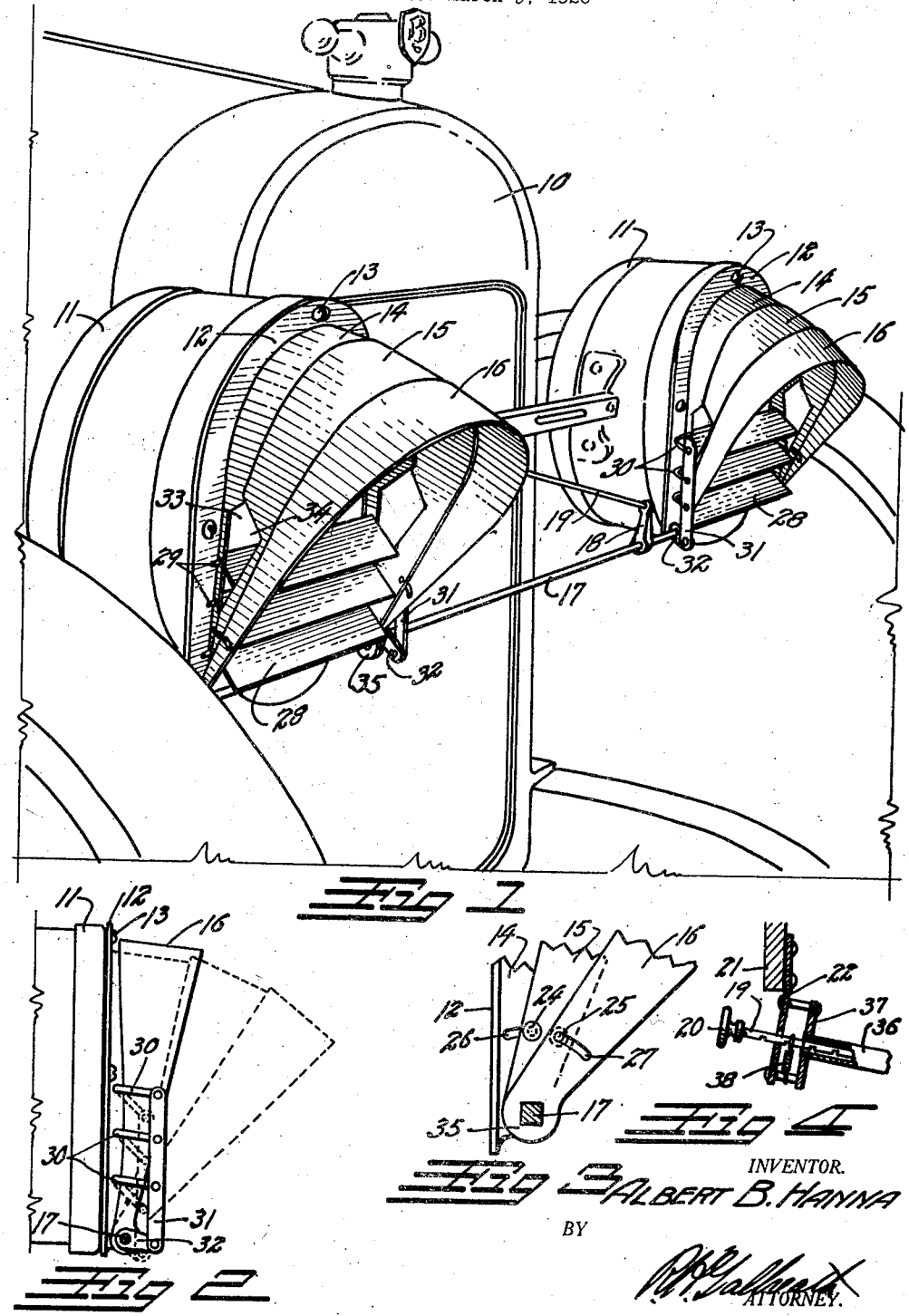
INVENTOR.
ALBERT B. HANNA
BY
ATTORNEY.

Patented Aug. 17, 1926.

1,596,831

UNITED STATES PATENT OFFICE.

ALBERT B. HANNA, OF DENVER, COLORADO.

GLARESHIELD.

Application filed March 9, 1926. Serial No. 93,419.

This invention relates to glare shields for automobile headlights, and has for its principal object, the provision of a device which can be attached to the present automobile headlights, without affecting their present construction in any way, and which can be operated from the driver's position to direct the light beams downwardly when desired, so as to prevent dazzling an approaching motorist.

Another object is to so construct the invention that the entire strength of the beams will be utilized regardless of the position in which they are directed.

A further object is to accomplish the above without it being necessary to move the present headlights.

Other objects and advantages reside in the detail construction of the invention which is designed for simplicity, economy, and efficiency. These will become more apparent from the following description.

In the following detailed description of the invention, reference is had to the accompanying drawing, which forms a part hereof. Like numerals refer to like parts in all views of the drawing and throughout the description.

In the drawing:

Fig. 1 is a perspective view illustrating the invention applied to the headlights of an automobile.

Fig. 2 is a side elevation of the invention illustrating in broken line the extended position.

Fig. 3 is a detail view of the hinge employed in the invention.

Fig. 4 is a detail view of the instrument board control for the invention.

An automobile is illustrated at 10, provided with the usual headlights 11. In applying the invention I secure a U-shaped face plate 12 to the forward face of the headlights 11 by means of suitable screws 13. This plate surrounds the sides and top or front opening of the headlight, and carries a fixed visor 14 terminating at its lower extremity in hinges 35. Pivoted at the hinges 35, and arranged to extend over the fixed visor 14, is a first movable visor 15 and a second movable visor 16. The movable visors are carried on a cross rod 17, which extends through the hinges 35 of both the face plates 12.

At the point where the visors connect with the cross rod 17, it is formed with a rectangular cross section, as indicated in Fig. 3. The second movable visor 16 is provided with rectangular openings to fit this rectangular section, so that it must rotate with the rod. The remaining visors have round openings so that the rod can rotate within them. The rod 17 is rotated through the medium of a crank 18 operated by an operating rod 19, which terminates in an operating button 20, convenient to the operator.

The rod 19 is preferably carried in a pipe or tube 36, as it passes through the hood of the automobile, and is carried at the instrument board 21 in a bracket 22 secured thereto. The tube 36 terminates in a plate 37 carried by the bracket 22. Adjacent the extremity of the rod 19 a series of notches 23 are formed which engage the bracket 22 to maintain the rod at any desired position. A spring 38 maintains the notches in engagement with the bracket.

The forward swing of the visor is limited, as illustrated in Fig. 3, by two studs 24 and 25 carried by the first movable visor 15. The stud 24 engages in an arcuate slot 26 in the fixed visor 16 and the stud 25 engages in a similar arcuate slot in the second movable visor. When the operating rod 19 is forced forwardly, the cross rod 17 rotates carrying the second fixed visor of each headlight in a forward arc. When the stud 25 reaches the extremity of the slot 27, it will draw the first movable visor along with the second movable one until the stud 24 reaches the limit of the slot 26.

When in the extended position of Fig. 1, the visor prevents any upwardly directed rays of light from reaching the eyes of an approaching driver. These upwardly extending rays are reflected by the visor upon the ground directly ahead of the vehicle, where they serve to illuminate the roadway immediately in front of the car.

To prevent rays from the lower part of the headlight from being directed upwardly, a series of louvers 28 are provided within the lower half of each face plate 12. These louvers are pivoted adjacent their rearward edges in the fixed visor 14, as shown at 29, at the outer side of each light. At the inner side the pivots terminate in relatively small cranks 30, which connect with a common vertical member 31. The member 31 is arranged to be moved vertically through the medium of a lever 32 secured on the cross rod 17.

The relation of the lever 32 to the visors, is such, that, when the visors are raised to the solid line position of Fig. 2, the visors will be directed substantially straight forward, allowing the light rays to pass as directed by the headlight reflector. When the visors are lowered to the broken line position of Fig. 2, the louvers 28 will also be lowered at their forward edges so as to direct any light from the lower half of the headlight downward upon the ground.

It is preferred to have the inner surfaces of the visors and the under surfaces of the louvers bright, so that they will effectively reflect the light rays.

A notch 33 is formed in each fixed visor 14 which co-acts with a similar notch 34 formed in the first movable visor 15 to form an opening in the side of the visor so as to allow the light to be visible from the side of the automobile, when the visors are down.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A headlight shield comprising, a plate arranged to be secured to the face of said headlight, said plate having an opening substantially equal to the lens opening of said headlight; a fixed visor secured to said plate and extending around the top and sides thereof; other visors pivoted to said fixed visor and arranged to extend forward therefrom; and louvers extending across the opening in said plate and arranged to operate simultaneously with said other visors.

2. A headlight shield comprising, a plate arranged to be secured to the face of said headlight, said plate having an opening substantially equal to the lens opening of said headlight; a fixed visor secured to said plate and extending around the top and sides thereof; other visors pivoted to said fixed visor and arranged to extend forward therefrom; and louvers extending across the opening in said plate; means for operating said other visors and said louvers simultaneously, said means comprising a horizontal rod secured to one of said visors; and a lever carried by said rod and operatively connected to each of said louvers.

3. A headlight shield comprising, a plate arranged to be secured to the face of said headlight, said plate having an opening substantially equal to the lens opening of said headlight; a fixed visor secured to said plate and extending around the top and sides thereof; other visors pivoted to said fixed visor and arranged to extend forward therefrom; and louvers extending across the opening in said plate; means for operating said other visors and said louvers simultaneously, said means comprising a horizontal rod secured to one of said visors; a lever carried by said rod; and a member arranged to be moved vertically by said lever and a crank on each of said louvers connected to said member.

4. A headlight shield comprising, a plate arranged to be secured to the face of said headlight, said plate having an opening substantially equal to the lens opening of said headlight; a fixed visor carried by said plate and having a contour to coincide with said opening, other visors pivoted to said fixed visor and arranged to extend forwardly therefrom; said visors having cut-away portions at their edges which co-act when said visors are extended to form openings in their sides.

In testimony whereof, I affix my signature.

ALBERT B. HANNA.